United States Patent Office 3,531,423
Patented Sept. 29, 1970

3,531,423
THERMAL AND OXIDATIVE STABILIZED POLYAMIDES
Kenneth B. Stokes and Stuart Harrison, Minneapolis, Minn., assignors to General Mills, Inc., a corporation of Delaware
No Drawing. Filed Mar. 7, 1968, Ser. No. 711,191
Int. Cl. C08g 51/60
U.S. Cl. 260—18                                7 Claims

ABSTRACT OF THE DISCLOSURE

There is disclosed polyamides stabilized against the action of air and/or heat, and in particular to stabilized polymeric fat acid polyamides. The stabilizers are pyrazolidone compounds such as 1-phenyl-3-pyrazolidone or 1-(4-phenoxyphenyl)-3-pyrazolidone.

---

The invention relates to polyamides stabilized against the action of air and heat, and in particular to stabilized polymeric fat acid polyamides.

It is known that many synthetic polymers when exposed to light, air, and/or heat become degraded in color and mechanical properties. Discloration and impairment of mechanical properties become more pronounced on exposure to increased temperatures. This is particularly true of the polyamide resins. The effect of known stabilizers is, however, relatively poor and some form colored decomposition or oxidation products.

It has now been found that improved stability can be obtained against the action of heat and air for polyamides which contain as stabilizers from 0.75 to about 4% by weight preferably from 1.0 to about 2% by weight of pyrazolidone compounds, particularly 1-phenyl-3-pyrazolidone and 1-(4-phenoxyphenyl)-3-pyrazolidone. In addition, other anti-oxidants and/or ultra-violet absorbers may be optionally employed in admixture with the pyrazolidone compound to provide optimum effect against light, heat and air.

The invention is applicable to polyamides which are susceptible to light, air, and/or thermal degradation. Accordingly, the invention finds utility with nylon polyamide resins and polymeric fat acid polyamides. The invention is particularly applicable to the polyamide resins, especially the polymeric fat acid polyamides. Illustrative of such polyamide resins are polycondensation or polyaddition products of caprolactams, as well as salts of adipic acid, suberic acid, sebacic acid, and undecanoic acid with hexamethylene diamine and decamethylene diamine.

The polyamides of polymeric fat acids are prepared from substantially equivalent amounts of amine and carboxyl groups. The relatively high molecular weight polyamides or polymeric fat acids having a dimeric fat acid content not less than 90% by weight and a diamine are of particular interest.

Illustrative of one type of such polyamide products are the products described in U.S. Pat. 3,249,629 describing polyamides of polymeric fat acids having a dimeric fat acid content above 95% and 1,3- or 1,4-cyclohexane-bis (methylamine). The preparation of polymeric fat acids can be found described in said U.S. Pat. 3,249,629.

Illustrative of other polyamides employed in the present invention are those described in Canadian Pat. 752,931, British Pats. 1,024,535 and 1,056,659, and Belgain Pats. 679,595, 697,601 and 697,275. The present invention is thus applicable to polyamides of polymeric fat acids prepared from diamines in general, but is particularly applicable to those prepared from polymeric fat acid having a dimeric weight content of 90% or more (as determined by gas-liquid chromatography of the corresponding methyl esters).

The diamines are aliphatic, cycloaliphatic or aromatic diprimary diamines which may be ideally represented by the formula

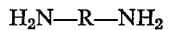

where R is an aliphatic, cycloaliphatic or aromatic radical preferably having from 2 to about 40 carbon atoms. While R is preferably a hydrocarbon radical, R may contain ether linkages such as in diamines prepared from diphenyl ether sometimes called diphenyl oxide. R may also be saturated or unsaturated, straight or branched chain. Representative of such diamines are the alkylene diamines having from 2 to 20 carbon atoms (preferably 2–6) such as ethylene diamine, 1,2-diamino propane, 1,3-diamino propane, 1,3-diamino butane, tetramethylene diamine, pentamethylene diamine, hexamethylene diamine, decamethylene diamine, and octadecamethylene diamine; metaxylylene diamine, paraxylylene diamine, cyclohexylene diamine, bis($\beta$-aminoethyl)-benzene, cyclohexane-bis (methyl amine), diaminodicyclohexylmethane, methylene dianiline, bis(aminoethyl) diphenyl oxide, and dimeric fat diamine. The diamine may be employed alone or mixtures of two or more may be employed. The most preferred diamines are the alkylene diamines in which the alkylene group has from 4–6 carbon atoms and mixtures thereof with dimeric fat diamine (preferably having 36 carbon atoms).

The dimeric fat diamine, sometimes referred to as "dimer diamine," "dimeric fat amine," or "polymeric fat acid diamine" are the diamines prepared by amination of dimeric fat acids. Reference is made thereto in U.S. Pat. 3,010,782. As indicated therein, these are prepared by reacting polymeric fat acids with ammonia to produce the corresponding nitriles and subsequently hydrogenating the nitriles to the corresponding amines. Upon distillation, the dimeric fat diamine is provided which has essentially the same structure as a dimeric fat acid except that the carboxyl groups are replaced by —$CH_2NH_2$ groups. Further, this diamine is also described in Research and Development Products Bulletin, CDS 2–63 by General Mills, Inc., June 1, 1963, as "Dimer Diamine" illustrated by the formula $H_2N$—D—$NH_2$ where D is a 36-carbon hydrocarbon radical of a dimeric fat acid.

Copolymerizing compounds may also be employed along with the polymeric fat acids. The copolymerizing compounds commonly employed are aliphatic, cycoaliphatic or aromatic dicarboxylic acids or esters which may be defined ideally by the formulae:

where R' is an aliphatic, cycloaliphatic or aromatic hydrocarbon radical preferably having from 1 to 20 carbon atoms (the most preferred being where R' is an alkylene radical having from 6–12 carbon atoms) and $R_1$ is hydrogen or an alkyl group (preferably having from 1 to 8 carbon atoms). Illustrative of such acids are oxalic, malonic, adipic, sebacic, suberic, pimelic, azelaic, succinic, glutaric, isophthalic, terephthalic, phthalic acids, benzenediacetic acid, naphthalene dicarboxylic acids and 1,4- or 1,3-cyclohexane dicarboxylic acid.

Essentially molar equivalent amounts of carboxyl and amine groups are employed in preparing the polyamide. Where copolymerizing dicarboxylic acids are employed, it is preferred that the carboxyl groups from the polymeric fat acid should account for at least 50 equivalent percent of the total carboxyl groups employed.

The invention will also find utility with copolymers of polymeric fat acids and the other polyamide resins described.

The invention finds particular utility in film packaging applications. In such applications it is necessary that the resin be subjected to temperatures up to 260° C. (500° F.) for periods of exceeding 24 hours, while undergoing mechanical working with pumps and nozzles. The molten resin is to be held in an open vessel exposed to air. This resin must retain its original transparent, essentially colorless, glossy appearance and when cast as film retain initial tensile properties. The majority of polymers, particularly polyamides, will rapidly degrade under the conditions set forth.

Accordingly, particularly since air may not be excluded, and additive must be employed which (a) entirely prevents skinninng, (b) protects the resin color, (c) is stable per se, (d) contributes no color except that of the diluted additive, (e) is (in effect) relatively notvolatile at 260° C., and (f) does not react adversely with other additives.

Many conventional additives serve to worsen the problem instead of providing improvement while others are ineffective at best and provide little, if any, improvement. However, the pyrazolidone compounds were found to be effective at temperatures of 200–260° C. in the presence of air without producing undesirable side effects. In addition it may be employed in combination with other additives.

The pyrazolidone is generally added to the polyamide subsequent to the preparation thereof. However, this stabilizer may also be added to the reactants in the polyamide preparation. Incorporation in this manner eliminates any so-called "bloom" (waxy appearances on the surface of the polyamide) which often appears when the stabilizer is added to the already prepared polymer.

One of the preferred resins for packaging applications is the polyamide of polymerized fatty acids, such as polymerized tall fatty acids and hexamethylene diamine employing substantially equivalent amounts of acid and amine. Such polyamide resins are prepared conventionally by reaction at 100 to 300° C. for a time sufficient to effect amidification, i.e. about 1 to 8 hours. Preferably, a temperature of 250° C. is employed at which temperaa time period of about 4–6 hours is preferred.

In the examples to follow the resin evaluated was that of polymerized tall oil fatty acids and hexamethylene diamine, employing substantially equivalent amounts of acid and amine and a temperature of 250° C. for about 6 hours. As packaging applications most desirably utilize resins having a melt viscosity at temperatures of use of from 200–300 poises, stearic acid was included as a monomer to control the viscosity of the resin, the preferred resin being one having a viscosity of 268 poises at 405° F., obtained by including 1% by weight based on the polymeric fat acids of stearic acid in the reaction mixture. Omission of the stearic acid will provide a product having a viscosity of 1300 poises. In place of stearic acid, any aliphatic monocarboxylic acid having up to 22 carbon atoms may be employed, those having 16–20 carbon atoms being preferred. It is also preferred that the aliphatic hydrocarbon monocarboxylic acid be saturated and unsubstituted although amine and/or acid unreactive substituents may be present. Preferably, when added the monocarboxylic is employed in an amount up to 4% based on the weight of polymerized fatty acids and most desirably about 1% by weight.

In evaluating the resin, skinning and bulk color change observations were made in addition to observations of the changes in properties such as tensile strength, elongation and yield strength. These tensile properties were determined in accordance with ASTM D1708–59T from microtensile specimens (15 mil molded film) using an Instron testing instrument and a cross head speed of 20 inches per minute unless otherwise noted. In the skinning and color tests, 100 cc. tubes were charged with 20 grams of the resin product. Ratings for skinning and color changes were made as follows:

For skinning:

A—No skinning at all
B—Trace of skinning—may be due to charring or darkening of thin film deposits left on the upper walls of tubes when the pelletized resin melted. Such extra thin film darkening is normal and expected, but is not at all indicative of behavior in bulk
C—Brown surface
D—Brown-black surface
E—Trace of solid skin at edges
F—Partial coverage of surface with solid skin
G—Complete coverage of surface with thin solid skin
H—Heavy brown solid skin
I—Heavier black solid skin
J—Charred For bulk color changes:

1—Unchanged—nearly water white
2—Uniform change—due to color of additive per se
3—Brown surface
4, 5, 6, 7, 8—Brown degradation products moving downward to color increasing volumes of the bulk polymer
9—All brown
10—Opaque black In the foregoing rating system a rating of H will probably correspond to a 1 or 2 color observation because the solid skin protects the bulk resin from further oxidation. Conversely, a rating of A will probably correspond to a 5 or 6 observation, since no protection is afforded by a skin. For packing applications and stabilization results of the product, ratings of A1, A2, B1 or B2 are considered satisfactory, but none other.

The invention is best illustrated by means of the following examples in which all parts and percentages are by weight unless otherwise indicated.

EXAMPLE I

Preparation of polyamide

A polyamide was prepared from 7.2 lbs. of hexamethylene diamine, 0.354 lb. of stearic acid and 35 lbs. of hydrogenated and distilled polymerized tall oil fatty acids having the following analysis:

| | |
|---|---|
| Acid value (A.V.) | 193.0 |
| Saponification value (S.V.) | 196.1 |
| Iodine value (I.V.) | 18.5 |
| Percent[1]— | |
| Monomer (M) | 1.0 |
| Intermediate (I) | 5.4 |
| Dimer (D) | 92.7 |
| Trimer (T) | 0.9 |
| Equivalent weight (based on S.V.) | 285 |
| Photometric color (percent) | 93 |

[1] Gas-liquid chromatography.

Also there was added an antifoaming agent (7 grams of a 1% solution of Dow Corning Antifoam A) and to insure complete amidification, a catalyst (25 grams of 10% $H_3PO_4$ solution). The reactants were mixed under vacuum at 50–68° C. and degassed. The reactor was sealed and heated to 180° C. then venting was started to remove water. The pressure was dropped from 90 p.s.i. to atmospheric pressure, the water vapor was carried off with $N_2$ gas and the temperature raised to 250° C. during the next one hour and 10 minutes. The reactor was put under vacuum, finally reducing pressure to 5 mm. after 45 minutes. The vacuum was broken with $N_2$ and held at 250° C. for one hour and 20 minutes (sampling and analysis run during this time). An additional 63 g. of hexamethylene diamine was added and the reactor sealed for one hour at 250° C. It was then evacuated for one hour, sampled and analyzed and another 20 g. of hexamethylene diamine added, sealed for one hour then evacuated for another hour. The resin was discharged from the kettle under nitrogen pressure and cut into small pieces. The resulting product had the following properties:

| | |
|---|---|
| Amine No. (meq./kg.) | 9.7 |
| Acid No. (meq./kg. | 23.5 |
| Melt viscosity, poises at 205° C. | 268 |
| Tensile strength (p.s.i.) | 2960 |
| Yield strength (p.s.i.) | 1400 |
| Elongation (percent) | 564 |

EXAMPLE 2

The foregoing product was evaluated as earlier described hereinabove under the conditions indicated below, in which a control and other additives are included for comparison.

(A) Conditions: 260° C. for 6 hours under a closed (mercury monometer) manifold, normal atmosphere and atmospheric pressure.

| Additive (1% by weight of product): | Rating |
|---|---|
| Control (268 poise—no additive) | G1 |
| 2,2' - thiobis(4 - methyl - 6 - tert - butyl phenol (CAO–6) | G3 |
| 1-phenyl-3-pyrazolidone (a) | A1 |
| 1-phenyl-3-pyrazolidone (b) | B2 |
| CAO–6+1-phenyl-3-pyrazolidone | B2 |
| Irgocet blue (transparent colorant) | H2 [1] |
| Irgazine blue (transparent colorant) | H2 |
| Ultramarine blue (transparent colorant) | H2 |

[1] Tends to turn greenish.

(B) Conditions: 260° C. for 6 hours open to the atmosphere.

| Additive and amount: | Rating |
|---|---|
| Control (268 poise—no additive) | G1 to G2 |
| 1% 1-phenyl-3-pyrazolidone | B2 |
| 2% 1-phenyl-3-pyrazolidone | A2 |
| 1% 2(2'-hydroxy-3',5'-di-tert - butylphenyl) 5 - chlorobenzotriazole (Tinuvin 327) | G2 |
| 2% 2(2'-hydroxy-3',5'-di-tert - butylphenyl) 5 - chlorobenzotriazole (Tinuvin 327) | G2 |
| 3% 2(2'-hydroxy-3',5'-di-tert - butylphenyl) 5 - chlorobenzotriazole (Tinuvin 327) | I2 |
| 1% 1-phenyl-3-pyrazolidone+3% Tinuvin 327 | B2 |
| 1% 1-phenyl-3-pyrazolidone+3% Tinuvin 327+0.5% DL-TDP (dilauryl thiodipropionate) | B2 |
| 1% 1-phenyl-3-pyrazolidone+3% Tinuvin 327+0.05% Ultramarine Blue | B2 |
| 1% 1-phenyl-3-pyrazolidone+0.03% Ultramarine Blue | A1 |
| 1% 1-phenyl-3-pyrazolidone+3% Tinuvin 327+0.1% Ultramarine Blue | A1 |
| 1% 1-phenyl-3-pyrazolidone+3% Tinuvin 327+0.2% Ultramarine Blue | A1 |
| 0.5% β,β'-thiodipropionic acid | F6 |
| 1.0% β,β'-thiodipropionic acid | G8 |

EXAMPLE III

A polyamide was prepared from hydrogenated and distilled dimer acid having the following analysis:

| | |
|---|---|
| Acid value | 194.3 |
| Sap. value | 197.6 |
| Iodine value | 17.1 |
| Percent: | |
| Monomer | 1.4 |
| Intermediate | 3.9 |
| Dimer | 94.0 |
| Trimer | 0.7 |
| GMI photometric color | 95.8 |

The polyamide was prepared from 250 lbs. of dimer, 3.7 lbs. of stearic acid, and 51.2 lbs. of hexamethylene diamine. Also added was a catalyst (134 g. triphenyl phosphite) and 74 g. of 10% solution of Dow Corning Antifoam A. The reactants were mixed under vacuum of 20–2″ Hg and degassed, the reactor sealed and heated to 200° C. (125 p.s.i.) in 1.5 hrs. venting off part of the water vapor. During the next 1.5 hrs. the reaction kettle was heated to 250° C., vented to atmospheric pressure and a N₂ purge used to carry off water. The next 3 hrs. and 10 min. the reaction was stirred at 250° C. and a vacuum pulled on the reactor until the pressure reached 5 mm. The vacuum was broken by introducing N₂ gas and 562 g. of hexamethylene diamine added. The reaction was held for 25 minutes at 250° C. and atmospheric pressure, then evacuated to 8 mm. pressure for 2 hours, vacuum broken with N₂ and another 200 g. of hexamethylene diamine added, held at 250° C. and atmospheric pressure for 20 minutes then evacuated again to 4 mm. Hg pressure. It was heated to 250° C. and stirred for another two hrs. before the resin was run out of the reactor under N₂ pressure and cut into small pieces (diced). It had the following analysis:

| | |
|---|---|
| Milliequivalents of acid/kg. | 30 |
| Milliequivalents of amine/kg. | 12 |
| Viscosity at 205° C. (poises) | 205 |

Samples of product were forwarded for evaluation in commercial equipment for a packaging application and yield strength (YS), ultimate tensile strength (UTS) and elongation (E) was determined. The results on unstabilized product can be seen from the following Table I.

TABLE I

| Time at 315–410° F. (hrs.) | YS (p.s.i.) | UTS (p.s.i.) | E (percent) |
|---|---|---|---|
| 0 | 1,850 | 2,225 | 672 |
| 17.25 | 1,550 | 2,280 | 562 |
| 20 | 1,680 | 1,520 | 355 |

Another product prepared according to Example I was also evaluated and the results upon stabilization with 1% of 1-phenyl-3-pyrazolidone plus 0.03% Ultramarine Blue can be seen from the following Table II.

TABLE II

| No. | History | YS (p.s.i.) | UTS (p.s.i.) | Percent E |
|---|---|---|---|---|
| 1 | Original Control | 1,760 / [1] 1,280 | 2,410 / [1] 2,595 | 411 / [1] 508 |
| 2 | After melting (Temp.=450° F.) (Time=0). | 1,610 | 2,420 | 488 |
| 4 | After 4 hours at 450° F. Held overnight at 350° F.: | 1,580 | 2,360 | 495 |
| 5 | 19½ hrs. (7½ hrs. at 450° F.) | 1,660 / [1] 1,520 | 1,560 / [1] 2,530 | 423 / [1] 511 |
| 6 | 22 hrs. (10 hrs. at 450° F.) | 1,610 / [1] 1,470 | 1,440 / [1] 2,440 | 406 / [1] 492 |

[1] Cross head speed=2.0 inches/minute. Remainder of data at 20 inches/minute.

As can be seen from the foregoing, with the unstabilized product in 20 hours at 315 to 410° F. only 67% of the original UTS and 53% of the elongation were retained. In addition, there was severe degradation in color. In contrast thereto with a stabilized product, when tested at 2.0 in./min. cross head rate, after 22 hours above 350° F. (10 hours at 450° F.) 96% of the original ultimate tensile strength and 97% of the elongation were retained. When tested at 20 inches per minute, 60% of the original ultimate strength but 99% of the original elongation were shown to be retained. Further there was no severe color degradation with the stabilized product.

In the foregoing, the stabilizer 1-phenyl-3-pyrazolidone was incorporated by dry blending with the polyamide resin. In the following example, there is shown the preparation of a polyamide wherein the pyrazolidone is incorporated in the reaction mixture in the preparation of the polyamide. Further, in so doing no stearic acid was required, since the final product had the desired melt viscosity of 255 poise at 205° C. The reactants, preparation procedure and product properties can be seen in the following example.

EXAMPLE IV

Reactants:

| Amount | Material | Equivalents |
|---|---|---|
| 165 g. | Hexamethylene diamine, eq. wt.=82.5 | 2.0 |
| 5.7 g. | 1-phenyl-3-pyrazolidone (1% by weight of polymreized acids) | |
| 570 g. | Hydrogenated polymerized tall oil fatty acids | 2.0 |
| 4 drops | $H_3PO_4$ | |

Analysis of polymerized tall oil fatty acids

Percent [1]—
| | |
|---|---|
| M | 1.7 |
| I | 4.5 |
| D | 90.7 |
| T | 3.1 |
| Acid value | 189.9 |
| Saponification value | 197.0 |
| Iodine value | 7.3 |
| Equivalent weight (based on S.V.) | 285 |

[1] Gas-liquid chromatography.

Preparation procedure

The polyamide was prepared by heating over 2 hours to the reaction temperature of 250° C., followed by 2 hours under a nitrogen sweep and ending with 2 hours under a partial pressure of 10–15 mm. Hg. All the ingredients except the diamine were charged at the start. The diamine was added gradually at 60° C. to avoid uncontrollable foaming.

Product properties

| | |
|---|---|
| Ball and ring softening point ° C. | 108 |
| Amine No. | 0.1 |
| Acid No. | 2.7 |
| Melt viscosity, poise at— | |
| 205° C. | 225 |
| 225° C. | 150 |
| 250° C. | 125 |
| Tensile yield, p.s.i. | 1390 |
| Tensile break, p.s.i | 2750 |
| Tensile elongation, percent | 580 |
| 2% tensile modulus, p.s.i. | 22300 |

The polyamide made in this manner showed very good color retention on heating in air at temperatures at 250° to 340° C. whereas the unstabilized polyamide made according to Example I discolored badly. The polyamide made in this manner showed no "bloom" of antioxidant on standing.

EXAMPLE V (A) Preparation of 1-(4-phenoxyphenyl)-3-pyrazolidone

Fifty-two grams of 4-phenoxyphenyl hydrazine [1] and 18.2 g. of β-propiolactone were dissolved in 100 cc. of benzene and placed in one liter flask equipped with a condenser and Stark & Dean tube. The solution was refluxed for two hours during which time 1.5 cc. of water separated in the Stark & Dean tube. Further refluxing produced no more water. The reaction mixture stood over night at room temperature. About 30 g. of crystalline material was filtered off and recrystallized from toluene. The recrystallized material melted at 144–147° C. but was not the desired phenidone product, however it was converted to 1-(4-phenoxyphenyl)-3-pyrazolidone by refluxing in mixed xylenes with 10% by weight of p-t-sulfonic acid. The product melted at 185–187° C. Its structure was confirmed by infra red and mass spectrometer examination.

(B) Evaluation of 1-(4-phenoxyphenyl)-3-pyrazolidone as a color stabilizer and antiskinning agent A simple test for determining the effectiveness of an antioxidant is to heat 25 grams of resin with stabilizer in a 150 cc. beaker placed open to air on a hot plate. The hot plate is controlled so that the melted resin temperature can be maintained at 280–300° C. A control is run at the same time using 25 g. of the resin without any stabilizer. The time to develop color is noted.

The above test was run on a low viscosity polyamide prepared in the same manner as the one described in Example I with 1-phenyl-3-pyrazolidone, 1-(4-phenoxyphenyl)-3-pyrazolidone and without stabilizer.

| | Polyamide, g. | Stabilizer | Amount of Stabilizer, g. |
|---|---|---|---|
| A | 25 | 1-phenyl-3-pyrazolidone | 0.25 |
| B | 25 | 1-(4-phenozyphenyl)-3-pyrazolidone | 0.25 |
| C | 25 | None | 0.25 |

Results

After 30 minutes at 300° C., C had a dark skin along edges of beaker whereas A and B had not appreciably changed in appearance. After two hours, C had general discoloration with very dark areas along the edges of beaker, A had one dark area on edge of beaker. B was essentially unchanged in color. There was no skinning on either A or B whereas C had skinning near edges of beaker.

The embodiments of the present invention in which an exclusive property or privilege is claimed are defined as follows:

1. A polymeric fat acid polyamide containing a phenylpyrazolidone selected from the group consisting of 1-phenyl-3-pyrazolidone and 1 - (4 - phenoxyphenyl)-3-pyrazolidone in a heat and air stabilizing amount.

2. A polyamide as defined in claim 1 wherein said polyamide contains from 0.75 to 4% by weight of said pyrazolidone.

3. A polyamide as defined in claim 1 wherein said polyamide contains about 1.0% by weight of said pyrazolidone.

4. A polyamide as defined in claim 1 and further containing ultramarine blue.

5. A polyamide as defined in claim 4 and further containing 2(2' - hydroxy-3',5'-di-tert-butylphenyl)5-chlorobenzotriazole.

6. A polyamide as defined in claim 1 wherein said polyamide contains 1% by weight of 1-phenyl-3-pyrazolidone and 0.03% ultramarine blue.

7. A polyamide as defined in claim 1 wherein said polymeric fat acid polyamide resin comprises the amidification product at temperatures of from 100 to 300° C. of substantially equivalent amounts of polymerized tall oil fatty acids having a dimeric fat acid content not less than about 90% by weight and hexamethylene diamine.

References Cited

UNITED STATES PATENTS 3,454,412  7/1969  Stokes _____ 260—18 X

FOREIGN PATENTS 930,565  7/1963  Great Britain.

DONALD E. CZAJA, Primary Examiner

C. W. IVY, Assistant Examiner

U.S. Cl. X.R.

106—287; 260—37, 45.8, 45.85, 45.95, 78

---

[1] Prepared as described in JOC 21, 394 (1956) and isolated as the free base.

UNITED STATES PATENT OFFICE
CERTIFICATE OF CORRECTION

Patent No. 3,531,423   Dated September 29, 1970

Inventor(s) Kenneth B. Stokes and Stuart A. Harrison

It is certified that error appears in the above-identified patent and that said Letters Patent are hereby corrected as shown below:

Column 1, line 55, delete "or" and insert -- of --.

Column 2, line 20, underscore "meta" and "para".

Column 3, line 36, after "tall" insert -- oil --.

line 41, delete "tempera-" and insert -- temperature --.

Column 6, line 6, delete "2" " and insert -- 29" --.

Column 7, line 10, delete "polymreized" and insert -- polymerized --.

line 41, delete "225" and insert -- 255 --.

SIGNED AND SEALED
NOV 24 1970

(SEAL)
Attest:

Edward M. Fletcher, Jr.
Attesting Officer

WILLIAM E. SCHUYLER, JR.
Commissioner of Patents